United States Patent [19]

Logan et al.

[11] Patent Number: 4,609,165
[45] Date of Patent: Sep. 2, 1986

[54] HELICOPTER AUXILIARY ENERGY SYSTEM

[75] Inventors: Andrew H. Logan, Rancho Palos Verdes; John D. Graves, Palos Verdes Estates, both of Calif.

[73] Assignee: Hughes Helicopters, Inc., Culver City, Calif.

[21] Appl. No.: 487,966

[22] Filed: Apr. 25, 1983

[51] Int. Cl.⁴ .............................................. B64C 27/12
[52] U.S. Cl. .............................. 244/17.19; 244/17.11; 416/43; 416/60; 416/170 R; 74/572; 280/217; 180/165
[58] Field of Search ............... 244/53 R, 58, 60, 17.11, 244/17.23, 17.19, 17.15; 416/43, 60, 170 R; 74/572; 280/217; 180/165

[56] References Cited

U.S. PATENT DOCUMENTS

| | | | |
|---|---|---|---|
| 1,779,524 | 10/1930 | Zaschka | 416/60 |
| 2,947,497 | 8/1960 | Sznycer | 244/17.11 |
| 3,485,037 | 12/1969 | Clerk | 74/572 |
| 3,734,222 | 5/1973 | Bardwick, III | 180/165 |
| 3,841,173 | 10/1974 | Kraus | 180/165 |
| 4,028,962 | 6/1977 | Nelson | 74/572 |
| 4,283,966 | 8/1981 | Hagin | 74/572 |

Primary Examiner—Galen L. Barefoot
Attorney, Agent, or Firm—Beehler, Pavitt, Siegemund, Jagger, Martella & Dawes

[57] ABSTRACT

Autorotation in helicopters at low altitudes can be achieved even when the inherent design of the helicopter would prohibit successful entry into the autorotation mode. Angular kinetic energy from the main propulsion engine is stored in a flywheel which automatically transfers this energy to the main drive shaft in the event of engine failure. During normal operation, the flywheel is driven through the main drive shaft by coupling to a secondary drive shaft. The main drive shaft in turn is driven by the engine through an overrunning clutch assembly. The flywheel is maintained within an evacuated housing whereby air drag is substantially eliminated. In the event of engine failure, the overrunning clutch disengages the engine from the main drive shaft and flywheel will continue to apply energy to the main drive shaft through the secondary drive shaft to permit autorotation and a no-damage landing even at low altitude flight levels.

9 Claims, 3 Drawing Figures

HELICOPTER AUXILIARY ENERGY SYSTEM

BACKGROUND OF THE INVENTION

1. Field of the invention

The present invention is in the field of propulsion systems for rotary wing aircraft and in particular is an apparatus for improving the autorotation performance of a helicopter operating within its "Dead Man Zone".

2. Description of the Prior Art

The lift capacity of a helicopter is totally dependent upon the rotary movement of the rotor blades and a helicopter does not, per se, have any glide characteristics which typify many fixed wing aircraft. Thus, in the event of a main propulsion plant failure in a helicopter, rotor speed drops when power is no longer delivered to the rotor system. Lift developed by the rotor system is thusly, in part, dependent upon rotor speed. At high enough altitudes, failure of the main propulsion plant will allow the pilot to successfully enter an autorotation mode wherein the descent of the helicopter is used to transfer power into the rotor system, thereby rotating the rotor blades, providing lift and thereby lessening the rate of descent. In a properly designed rotor system, a helicopter will be able to survive a hard landing in the autorotation mode but only if enough energy is coupled into the rotor system during descent. Due to the limitations of prior art helicopter designs, sufficient energy cannot be coupled into the rotor system unless the helicopter is at or above a minimum altitude at the time of power failure.

However, many of the flight applications for helicopters are and must be conducted at low altitudes which are well below the minimum altitude for safe autorotation. These altitude zones, commonly called "dead man zones", represent altitudes below which power failure in a single engine helicopter will generally result in a crash landing.

In military applications, flight operations are typically conducted in the dead man zones to reduce target vulnerability and maintain surprise. However, it is also within this altitude zone that damage to a helicopter in a combat engagement is most prevalent. Therefore, in military operations, a high proportion of aircraft loss is caused by loss or partial loss of the main propulsion system in the low altitude zone followed by the inability of the helicopter to autorotate to an undamaged landing.

Therefore, what is needed is some means which will allow a rotary aircraft to autorotate to an undamaged landing in the dead man zone where, for any reason, a loss or substantial disability is suffered by the main propulsion system.

BRIEF SUMMARY OF THE INVENTION

The present invention is an auxiliary energy supply for autorotation of rotary wing aircraft which includes an engine, an overunning clutch coupled to the engine, a main drive shaft which is coupled to the overunning clutch, and a rotor system coupled in turn to the main drive shaft. The auxiliary energy source comprises a flywheel assembly for accumulating and storing angular kinetic energy and a drive mechanism which is coupled to the flywheel assembly. The drive mechanism is also coupled to the main drive shaft which is driven by the engine through the overrunning clutch. The drive mechanism transmits angular kinetic energy from the main drive shaft to the flywheel assembly when the main drive shaft is driven by the engine during normal operation. The drive mechanism then retransmits the angular kinetic energy which is stored within the flywheel assembly from the flywheel assembly back to the main drive shaft when the engine has failed or ceased operation and the overrunning clutch has disengaged the engine from the main drive shaft.

The rotor system thus continues to operate for a predetermined period of time after the engine has ceased operation, thereby continuing to provide lift to the rotary wing aircraft and permitting the aircraft to land in an autorotation mode even at low altitudes.

More particularly, the present invention includes an overrunning clutch which is coupled to the main drive shaft. The overrunning clutch transmits angular kinetic energy from the engine to the drive shaft and thence to the rotor system. A secondary drive shaft is coupled to the main drive shaft at all times. The secondary drive shaft transmits angular kinetic energy from the main drive shaft to a housing. The housing includes a drive chamber and flywheel chamber. The secondary drive shaft extends into the housing into the drive chamber. The secondary drive shaft is coupled to and drives a fixed-ratio gearing assembly. The fixed-ratio gearing assembly is disposed in the drive chamber of the housing, and is arranged and configured to transmit angular kinetic energy both to and from the secondary drive shaft. A flywheel is rotatably disposed within the flywheel chamber of the housing and in turn is coupled to the fixed-ratio gearing assembly so that the angular kinetic energy transmitted through the gearing assembly from the secondary drive shaft is imparted to the flywheel at a substantially increased angular velocity. The flywheel accumulates and stores angular kinetic energy. A roughing vacuum pump communicates within the drive chamber of the housing and provides a partial vacuum of a first pressure within the drive chamber thereby reducing air drag in the gearing assembly. A high vacuum pump communicates with the flywheel chamber of the housing and maintains a higher partial vacuum within the flywheel at a second pressure thereby similarly reducing air drag with the flywheel disposed within the flywheel chamber.

Therefore, angular kinetic energy is transmitted from the engine to the flywheel in the flywheel chamber of the housing until a maximum magnitude is obtained as characterized by in-flight conditions of the rotary wing aircraft. In the event of failure of the main propulsion engine, angular kinetic energy is then retransmitted from the flywheel through the fixed-ratio gearing assembly to the secondary drive shaft and ultimately to the main drive shaft and rotor system to enable the rotor wing aircraft to accomplish an autorotative descent to a no-damage landing.

The structure and operation of the present invention can be better understood by considering the following figures wherein like elements are referenced by like numerals.

The present invention and its various embodiments are best understood by viewing the above Figures in light of the following detailed description of the preferred embodiments.

DETAILED DESCRIPTION OF THE PREFERRED EMBODIMENTS

The present invention is an auxiliary energy supply for a helicopter wherein energy is transferred from the main engine to a flywheel system through a driveshaft system. Thus, when a helicopter and its main engine are properly operating kinetic energy is continually provided to and maintained at a predetermined level in the flywheel system. However, if in any event the main propulsion system should cease to operate, it is automatically disengaged from the main drive shaft by means of an overrunning clutch while the flywheel system continues to be engaged through its own driveshaft to the main drive shaft and hence the main rotor transmission. Therefore, stored angular kinetic energy within the flywheel system continues to be delivered to the rotor system of the helicopter. A sufficient amount of energy is stored within the flywheel system such that the helicopter can immediately be put in an autorotation mode even at low altitudes below which its inherent design would otherwise prohibit successful autorotation performance. Thus, the helicopter can be safely landed, and probability of an undamaged landing is substantially increased even for flight operations within the dead man zone.

The flywheel system of the present invention is particularly characterized by a secondary drive shaft extending from the engine output shaft or main drive shaft to a flywheel housing where the secondary drive shaft engages a fixed-ratio gear reduction assembly which in turn is engaged to a flywheel. Both the gear assembly and the flywheel are run within a vacuum mantained within the flywheel housing to minimize and substantially eliminate air drag and heat accumulation with the gear assembly and flywheel.

The present invention, its embodiments and its mode of operation can better be understood by now considering its implementation in detail as illustrated in the figures.

Figure 1:
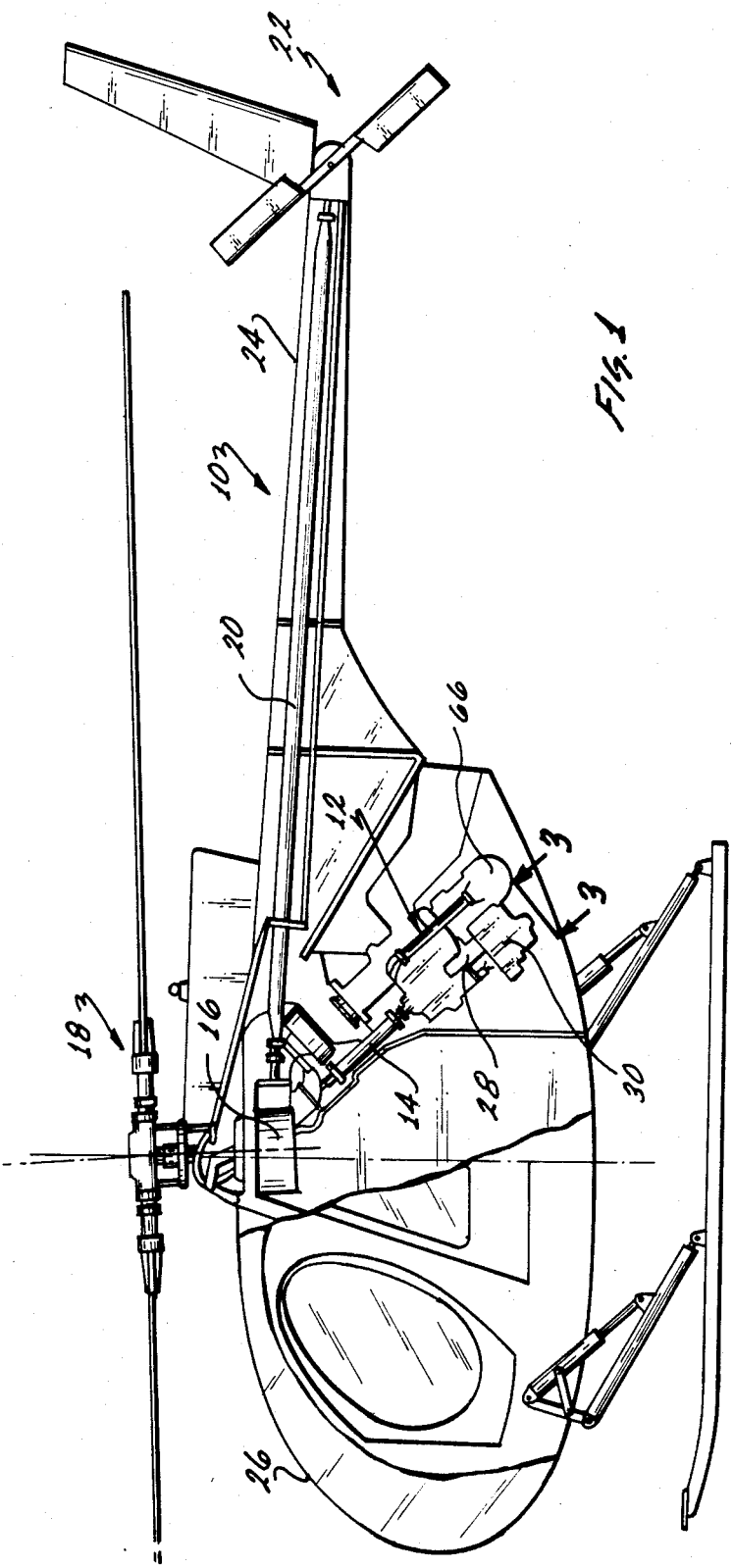
FIG. 1 is a cutaway side view of a helicopter incorporating the auxiliary energy system of the present invention.

Referring now to FIG. 1, a helicopter, generally denoted by reference numeral 10 is shown in partial cutaway side view, thereby exposing a diagramatic side view of the main propulsion engine, generally denoted by reference numeral 12, of main drive shaft 14, transmission 16 and a rotor system generally denoted by reference numeral 18. Power is delivered from the main propulsion 12 through transmission 16 to rotor system 18 in a conventional manner. Similarly, a tail rotor drive shaft 20 is coupled to transmission 16 and delivers power to the tail rotor system, generally denoted by reference numeral 22, located on the tail 24 of fuselage 26 of helicopter 10. Again, all the elements of transmission 16 and tail rotor system 22 and main rotor system 18 are conventional and no further description will be given of these components of helicopter 10.

Referring now particularly to main propulsion engine 12, engine 12 is coupled to transmission 16 by a main transmission shaft 14 by means of an overrunning clutch mechanism 28 diagramatically shown in FIG. 1 and described in more detail in connection with FIG. 2. As will be described below, rotational kinetic energy is transferred from main engine 12 to drive shaft 14 and into flywheel assembly 30. However, in the event of a failure of main propulsion engine 12, overrunning clutch 28 will disconnect the engine from the main rotor transmission input drive shaft 14 in a manner described in connection with FIGS. 2 and 3 and the rotor system will be powered for a predetermined period of time by the angular kinetic energy stored in flywheel assembly 30.

Figure 2:
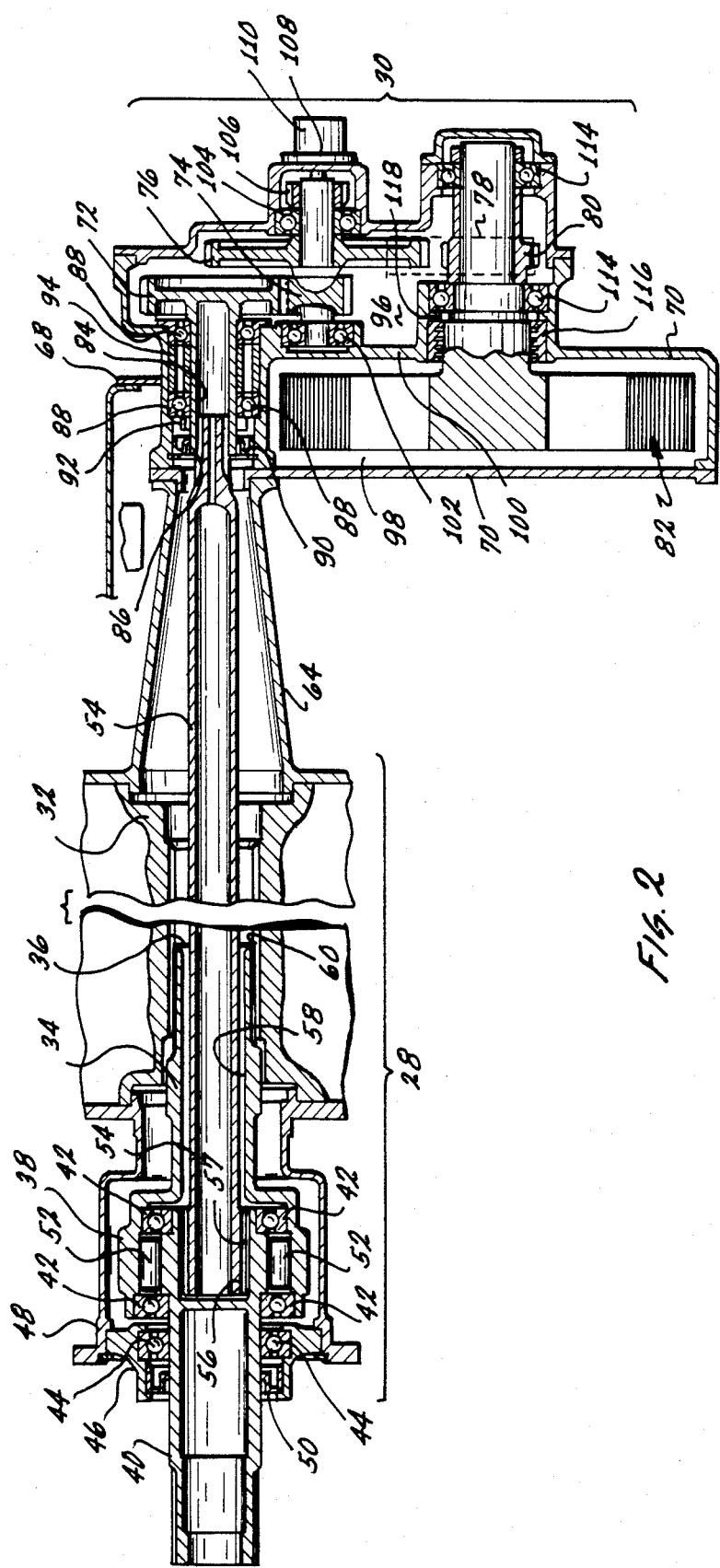
FIG. 2 is a partial, cutaway sectional view of the auxiliary energy source of the present invention taken through line 2—2 of FIG. 3.

Referring now to FIG. 2, overrunning clutch 28 and flywheel assembly 30 are shown in enlarged scale in a partial section. The sectional view of overrunning clutch 28 is taken through a longitudinal section through the axis of main drive shaft 14, while the cross-sectional view in FIG. 2 through flywheel assembly 30 is taken through irregular line 2—2, depicted in FIG. 3.

Consider first overrunning clutch 28. Overrunning clutch 28 is a conventional clutch well-knnown in the art as a Sprag clutch such as sold by Borg-Warner Corp. of Bellwood, Ill. as model no. 3488a. Although well known in the art, overrunning clutch 28 will be briefly described here to provide a clear understanding of how main propulsion engine 12 is automatically disengaged thereby leaving flywheel assembly 30 alone engaged to main drive shaft 14.

The principal elements of overrunning clutch 28 are a housing 48, an engine output shaft 34, and an output shaft 40. Engine-to-transmission shaft 14 (not shown in FIG. 2) is coupled through overrunning clutch 28 to engine output shaft 34 of main propulsion engine 12, which shaft 34 is shown in partial cutaway view in FIG. 2. Engine output shaft 34 terminates in expanded bell-shaped hub 38. Shaft 34 is splined to and driven by engine member 32. As illustrated in FIG. 2 hub 38 is journaled relative to output shaft 40 by means of a plurality of ball bearing races 42. Roller jam bearings 52 selectively couple shafts 34 and 40 as described below. Output shaft 40 of clutch 28 in turn is journaled by means of ball bearing races 44 to an end cap 46 which is engaged to a housing 48. End cap 46 is sealed to output shaft 40 by oil seal 50 at its left end. The entire mechanism of clutch 28 is lubricated by a conventional pressurized oil system which has been omitted for the sake of clarity.

Engine output shaft 34 is selectively coupled to output shaft 40 by means of a plurality of roller jam bearings 52 disposed within a race defined between bell shaped hub 38 and output shaft 40. Jam bearings 52 will release to allow shaft 40 to continue rotating in the preferred sense while shaft 34 and bell shaped hub 38 either stop or lag behind the speed of rotation of shaft 40. Jam bearings 52 permit an opposite relative rotation between output shaft 40 and engine output shaft 34. In other words, assuming a frame of reference which is fixed with respect to output shaft 40, when shaft 34 and bell-shaped hub 38 rotate, for example, in a counter-clockwise direction in the frame of reference fixed to shaft 40, roller bearings 52 will jam tightly prohibiting any relative angular displacement between hub 38 and output shaft 40. As a result, output shaft 40 will be directly driven by and with hub 38. However, when main engine 12 fails and shaft 34 and hub 38 cease to rotate or at least lag behind the speed of rotation of output shaft 40, hub 38 will appear to rotate in a counterclockwise sense in the reference frame fixed with respect to output shaft 40. In this condition, roller bearings 52 will unjam and freely permit counterclockwise relative angular rotation of output shaft 40 with respect to hub 38. The details of roller bearings 52 and the bearing race in which they are disposed has not been described inasmuch as such design is well known in the art. The selective drive performance of overrunning clutch 28 has been described here only to provide a general background in order to clearly describe its cooperation with output shaft 40 of the present invention.

Secondary drive shaft 54 is splined at its left end 56 as illustrated in FIG. 2 to internal slines defined in axial bore 57 at the right end of output shaft 40. Therefore, output shaft 40 and secondary drive shaft 54 are directly engaged with each other at all times. Secondary drive shaft 54 extends through an internal longitudinal bore 58 defined within input shaft 34 and through internal bore 60 of engine output shaft 34. Secondary drive shaft 54 then extends from housing 48 through engine output shaft 34 through a transition housing 64 and into flywheel assembly 30.

Figure 3:
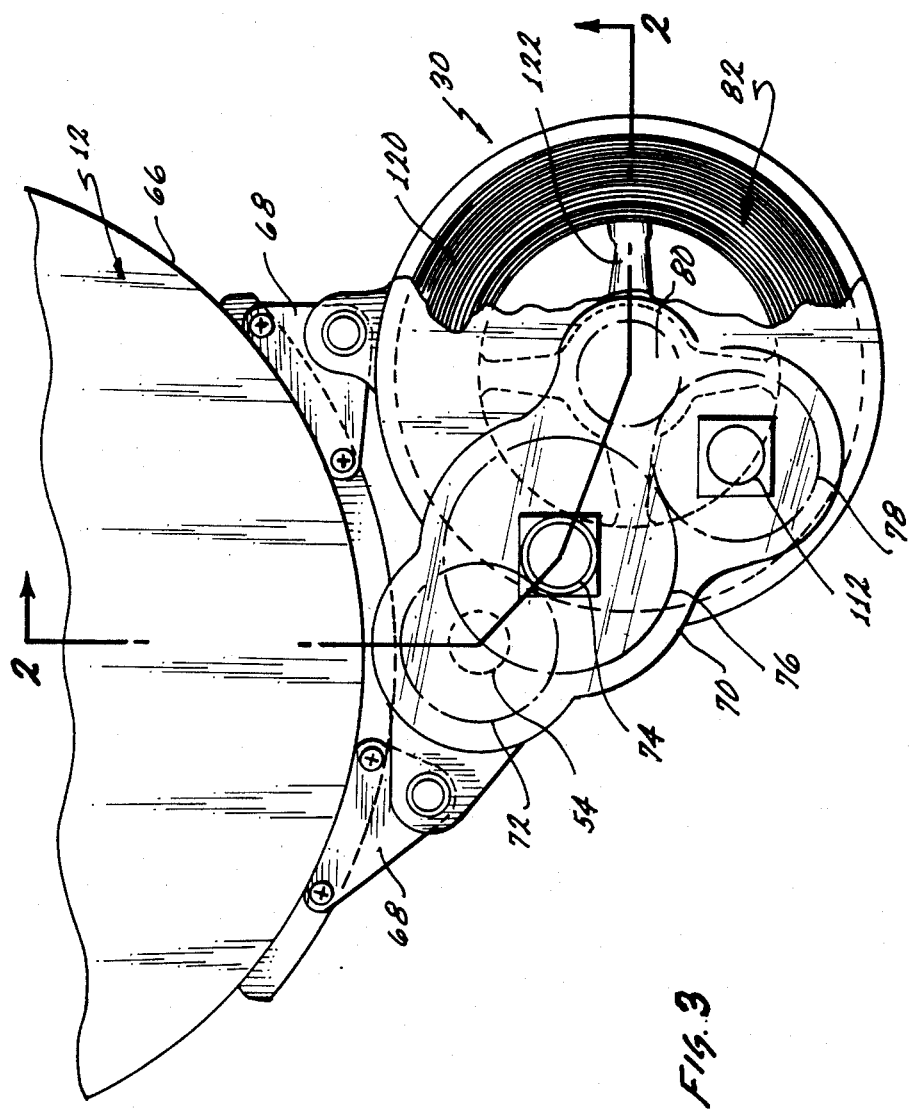
FIG. 3 is a partial cutaway end view of the auxiliary energy system in enlarged scale as seen from the view of line 3 of FIG. 1.

Turning now to FIG. 3, flywheel assembly 30 is connected to main engine housing 66 by means of connection at an engine pad and support brackets 68, although any alternative means could be used equally as well. Secondary drive shaft 54 is shown in dotted outline as extending into a flywheel housing 70 and coupling with a first gear 72, diagramatically shown in FIG. 3 in dotted outline. As more directly seen in FIG. 2, first gear 72 is engaged with a toothed shaft 74, which in turn is extended to form a second gear 76. With continued reference to FIG. 3, second gear 76 in turn engages an idler gear 78. Idler gear 78 is also engaged to a toothed shaft 80 which is connected to and forms part of a flywheel, generally denoted by reference numeral 82. Each of the gears collectively comprise a fixed-ratio gear reduction assembly which is coupled to the flywheel at all times.

Consider now a sectional view taken along line 2—2 as shown in FIG. 3 drawn through a vertical plane through engine housing 66 to the center of secondary transmission shaft 54 and thence to the center of toothed shaft 74 of second gear wheel 76. Section line 2—2 then continues from the center of shaft 74 to the center of flywheel shaft 80 and thence extends to the right as shown in FIG. 3 in a horizontal direction.

Refer now to FIG. 2, which shows a partial sectional view taken through line 2—2 just described. Secondary transmission shaft 54 extends into flywheel housing 70 and is splined to a mating bore 84 defined in shaft 86. Shaft 86 is journalled with respect to housing 70 by means of a pair of roller bearings 88 and extends therefrom to form first gear wheel 72. A retaining cap 92 is connected about shaft 86 and retains left ball bearing race 88 in position against cylindrical spacing sleeve 94 and right hand ball bearing race 88 in which shaft 86 is journalled. As described above, housing 48, including transition housing 64, is at atmospheric pressure while the interior of flywheel housing 70 is evacuated. The space of housing 48 and 64 is sealed from the evacuated space of flywheel housing 70 by means of a seal 90, which may include both O-ring pressure seals and oil seals.

Flywheel housing 70 is divided into two internal spaces, a drive chamber generally denoted by reference numeral 96 and a flywheel chamber generally denoted by reference numeral 98. An internal wall 100 separates chambers 96 and 98, one from the other. Gears 72, 76 and 78 are disposed within drive chamber 96 while flywheel 82 is disposed within flywheel chamber 98.

First gear 72 extends from bearing races 88 and as stated above and engages a toothed shaft 74. Shaft 74 in turn is journalled at its left end as shown in FIG. 2 to dividing wall 100 by means of ball bearing race 102 and is journalled at its opposing end to housing 70 by means of ball bearing race 104. A retaining cap 106 maintains bearing race 104 in position against the hub of second gear 76 which is formed as part of shaft 74 or may be splined or otherwise connected thereto. Shaft 74 also extends beyond bearing race 104 and cap 106 and provides a drive shaft extension 108 to drive a lube-oil pump 110.

Lube-oil pump 110 is of conventional design and is used to power a lubrication system within evacuated drive chamber 96 and flywheel chamber 98. All bearings and gears within housing 70 are lubricated by a fine mist spray system designed and implemented according to conventional principles which system has been omitted from FIG. 2 for the sake of clarity. The lubrication system includes in addition to circulating lubrication pump 110 the following elements which have also not been illustrated for the sake of clarity, namely, a sump tank, filter, cooler, and temperature and metal chip indicators, each of which are well-known to the art and are combined according to well-understood design principles in flywheel assembly 30 of the present invention.

As best seen in FIG. 3, second gear 76 engages an idler gear 78 which is also journalled to housing 70 and wall 100 in a similar manner to that of shaft 74, although not expressly shown in the drawings. Idler gear 78, as shown in FIG. 3, thus simultaneously engages second gear 76 and toothed flywheel shaft 80. The shaft of idler gear 78 is extended in a similar manner to that shown with respect to shaft 74 and lubrication pump 110 to a roughing vacuum pump 112, shown diagramatically in FIG. 3. Idler gear 78 thus drives roughing vacuum pump 112 which is of conventional design and which has its vacuum intake communicated with drive chamber 96. Again, the manner of communication between roughing pump 112 and drive chamber 96 is devised in a conventional manner according to well-understood principles and has been omitted from the drawings for the sake of clarity.

Flywheel shaft 80 is journalled in a similar manner to housing 70 and wall 100 as described above in connection with shaft 74, namely, shaft 80 is journalled to housing 70 by means of a pair of ball bearing races 114. Referring to FIG. 2, shaft 80 thus extends from drive chamber 96 into flywheel chamber 98 and may form an integral part of flywheel 82. A conventional molecular pump or high vacuum pump 116, commonly known as a Holweck molecular air pump, is disposed between the main body of shaft 80 and flywheel 82 and is in communication with roughing pump 112 through a bleed hole 118 defined through interior wall 100, which hole 118 communicates with the space between molecular pump 116 and the leftmost bearing race 114 of shaft 80. Molecular pump 116 is backed by roughing pump 112 to provide a partial vacuum of approximately one micron of Hg in flywheel chamber 98, thereby discharging gas from flywheel chamber 98 into drive chamber 96. Roughing pump 112 in turn maintains a partial vacuum within drive chamber 96 at approximately one Torr (1 mm. of Hg). Therefore, the entire gear drive mechanism, which gears up the rate of angular rotation of secondary drive shaft 54 to flywheel 82, and flywheel 82 by a ratio of at least 6.67:1.00 itself, is maintained in a vacuum with a particularly high vacuum maintained in the proximity of flywheel 82. Substantially all effects of air drag and heat, which would otherwise substantially interfere with a near lossless retention of energy are thereby avoided.

Flywheel 82 is shown in FIG. 2 and best in FIG. 3 as a spoked wheel having a generally cylindrical rim 120 connected to flywheel shaft 80 by plurality of radial spokes 122. In one embodiment, the weight of flywheel 82 and the entire gear assembly is approximately seventeen and a half pounds. During normal flight operations, flywheel 82 will achieve rotational speeds of the order of 40,000 RPM and the mass and rotational velocity of flywheel 82 together with the entire gear assembly coupling flywheel 82 to secondary drive shaft 54 will store and provide sufficient auxiliary energy to continue to drive secondary drive shaft 54, output drive shaft 40 and ultimately rotor system 18 during and autorotational mode.

Rim 120 of flywheel 82 is formed of a toroidal bundle of circumferentially laid filaments wound in a toroidal shape and then bound together in a plastic matrix using manufacturing techniques and materials well-known to the art such as described in U.S. Pat. No. 4,036,080. The strength of rim 20 and its fatigue resistance to the centrifugal forces to which it is subjected is far superior to that experienced with conventional metallic flywheels known in the prior art.

During normal operations and depending on the helicopter design, flywheel system 30 of the present invention is capable of delivering a peak horsepower of approximately 140 horsepower to secondary transmission shaft 54 and continues to provide useful autorotational horsepower of not less than 60 hp for not less than 15 seconds. These power characteristics are generally sufficient to drive rotor system 18 and allow helicopter 10, when flying in the dead man zone, to effectuate an undamaged landing.

In the event that all or a substantial part of the vacuum within housing 70 is lost, air drag within housing 70 will cause a rapid build up of a substantial amount of frictionally generated heat between air or gas within housing 70 and flywheel 82. In addition to substantial loss of efficiency of the auxiliary energy source, such heat will ultimately cause the deterioriation or destruction of flywheel 82 or other components within the flywheel assembly. However, instead of a melt-down and loss of structural integrity as might occur in the case of metallic flywheels, the fiber matrix material of which flywheel 82 is composed simply melts to form an irregular mass resembling a cotton ball. Thus, catastrophic destruction or explosion is avoided.

However, when such failure occurs for this reason or any other, such failure is characterized by a dramatically reduced angular kinetic energy applied to secondary shaft 54 and often the creation of a drag load on shaft 54. Therefore, the rotor system will then tend to drive transmission input shaft 40, which is normally the input shaft to the transmission, which in turn will drive secondary drive shaft 54 as if it were a load rather than source of angular kinetic energy. Clearly, in the case of such a failure, angular kinetic energy is then transferred from the rotor system into the flywheel system.

Therefore, a means for decoupling secondary drive shaft 54 from transmission input shaft 40 is included within secondary drive shaft 54. Referring to FIG. 2, a shear portion 130 of the secondary drive shaft 54 is provided with an annularly defined necked-down channel 132 which is designed, according to principles well known in the art, to shear or fail at a predetermined magnitude of torque load. Given the composition of shaft 54 and its inner diameter, a predetermined shear value can be arbitrarily set at any torque load equal to or less than the maximum torque load sustainable by secondary drive shaft 54 without such a necked down portion 132. The predetermined magnitude is that torque level just above all load levels which will be encountered during normal inflight operations or normal autorotative operation. Therefore, any failure within the flixed-ratio gear reduction assembly or flywheel assembly which causes the application of torque beyond the maximal torque expected under any condition of normal operation, including autorotation, will be treated as a failure, thereby causing the gear reduction assembly any flywheel assembly to be decoupled from main drive shaft 40. However, slight deteriorations of the performance of the flywheel assembly which do not exceed magnitudes normally encountered in flight operations, including autorotation, will automatically be ignored and the flywheel assembly will remain coupled to the rotor system.

Although the means for decoupling the flywheel assembly and gear reduction assembly from the main drive shaft or rotor system has been shown in FIG. 2 by way of example as a necked-down annular channel 132, it must be clearly understood that many other means could be provided which are equivalent thereto without departing from the spirit and scope of the invention. Channel 132 may be provided at other positions along secondary drive shaft 54 other than the indicated shear portion 130, or may in fact be located elsewhere within the drive chain. Although an annular channel has been described as a shearing element, clutches and shear plates could also be substituted therefore if desirable.

It must be understood that many modifications or alterations may be made by those having ordinary skill in the art without departing from the spirit and scope of the present invention. For example, although a single flywheel 82 has been shown in the illustrated embodiment, it is entirely possible that counter-rotating flywheels could also be employed where the angular moments of inertia which are developed at operational speeds becomes significant and would thus factor into the flight dynamics of a helicopter. In the embodiment described above, the angular moment of inertia is sufficient to provide autorotational energy for an adequate period for a safe and undamaged hard landing, however, the angular inertia is not sufficient to materially or detrimentally interfere with the flight characteristics of the helicopter as a whole.

In addition, other drive shaft mechanisms and types of fixed-ratio gearing assemblies may be used through which flywheel 82 may be coupled to main transmission shaft 14. The described embodiment has been shown here only for the purposes of illustration and should not be taken as limiting the scope of the following claims.

We claim:

1. An auxiliary energy source for autoration of rotary-wing aircraft including an engine, an overrunning clutch coupled to said engine, a main drive shaft coupled to said overrunning clutch, and a rotor system coupled to said main drive shaft, said auxiliary energy source comprising:

flywheel means for accumulating and storing angular kinetic energy; and a drive mechanism coupled to said flywheel means and coupled to said main drive shaft driven by said engine for transmitting angular kinetic energy from said main drive shaft to said flywheel means when said main drive shaft is driven by said engine through said clutch and for retransmitting angular kinetic energy stored within said flywheel means from said flywheel means to said main drive shaft when said engine has ceased operation and said overrunning clutch disengages said engine from said main drive shaft, whereby said rotor system continues to operate for a predetermined period of time after said engine has ceased operation, thereby continuing to provide lift to said rotary-wing aircraft and permitting said aircraft to land in an autorotation mode, wherein said flywheel means includes a housing, a flywheel rotatively jounalled within said housing, and wherein said drive mechanism includes a secondary drive shaft extending from said main drive shaft into said housing, fixed-ratio gearing means for coupling said secondary drive shaft to said flywheel, and vacuum pumping means for substantially evacuating the interior of said housing wherein said flywheel rotates within a partial vacuum maintained within said housing by said vacuum pumping means;

wherein said housing includes a drive chamber and a flywheel chamber, said flywheel being disposed within said flywheel chamber, wherein said gearing means is disposed within said drive chamber, and wherein said vacuum pumping means includes a roughing pump for evacuating said drive chamber to a first partial vacuum of a first predetermined pressures, and includes a high vacuum pump to evacuate said flywheel chamber to a second partial vacuum having a second pressure, said roughing pump communicating with said flywheel chamber whereby said flywheel chamber is evacuated to said first pressure and whereby said high vacuum pump evacuates and maintains said second pressure within said flywheel chamber.

2. An apparatus in a rotary wing aircraft for providing auxiliary energy in an autorotation mode, said rotary wing aircraft including a rotor system, a main propulsion engine, and a drive shaft connecting said main propulsion engine with said rotor system, said apparatus comprising:

an overrunning clutch coupled to said main drive shaft, said overrunning clutch for transmitting angular kinetic energy from said main propulsion engine to said main drive shaft;

a secondary drive shaft coupled to said main drive shaft, said secondary drive shaft having angular kinetic energy transmitted thereto from said main drive shaft;

a housing, said housing defining a drive chamber and a flywheel chamber, said secondary drive shaft extending into said housing into said drive chamber;

fixed-ratio gearing means coupled to said secondary drive shaft extending into said housing and driven thereby, said fixed-ratio gearing means being disposed in said drive chamber of said housing and for transmitting angular kinetic energy to and from said secondary drive shaft;

a flywheel rotatably disposed within said flywheel chamber of said housing and coupled to said fixed-ratio gearing means so that said angular kinetic energy transmitted through said gearing means from said secondary drive shaft is imparted to said flywheel, said flywheel for accumulating and storing angular kinetic energy;

a roughing vacuum pump communicating with said drive chamber of said housing for providing a partial vacuum of a first pressure within said drive chamber whereby air drag with said gearing means is substantially reduced; and a high vacuum pump communicating with said flywheel chamber of said housing for maintaining a partial vacuum within said flywheel chamber of a second pressure whereby air drag with said flywheel disposed within said flywheel chamber is substantially reduced, whereby angular kinetic energy is transmitted from said main propulsion engine to said flywheel in said flywheel chamber of said housing to a maximum magnitude as characterized by inflight conditions of said rotary wing aircraft and whereby in the event of failure of said main propulsion engine, angular kinetic energy is transmitted from said flywheel through said gearing means to said secondary drive shaft and to said main drive shaft to said rotor system to enable said rotary wing wing aircraft to accomplish an autorotative descent to a no-damage landing.

3. The apparatus of claim 2 wherein said flywheel includes a generally circular rim fabricated of circumferentially laid fibers in a plastic matrix.

4. The apparatus of claim 2 wherein said secondary drive shaft includes means for decoupling said secondary drive shaft from said main drive shaft when said flywheel or gear reduction assembly fails.

5. The apparatus of claim 4 wherein said means for decoupling is comprised of a necked-down annular portion of said secondary drive shaft, said annular portion arranged and configured to shear at a predetermined torque load, said predetermined torque load being characteristic of torque applied to said secondary drive shaft when said flywheel assembly or gear reduction assembly fails.

6. An improvement in an apparatus for autorotation of rotary wing aircraft including an engine, a main drive shaft coupled to the engine, said improvement comprising:

a fixed-ratio gear reduction assembly coupled to said main drive shaft, and a flywheel assembly coupled to said fixed-ratio gear reduction assembly whereby angular kinetic energy stored within said flywheel may be transferred between said flywheel assembly and said main drive shaft, said fixed-ratio gear reduction assembly being coupled therebetween at all times whereby a substantially higher rate of angular rotation of said flywheel is matched to a substantially lower rate of angular rotation of said main drive shaft;

wherein said gear assembly and flywheel assembly are maintained within a partial vacuum, a higher vacuum being maintained about said flywheel assembly than said gear reduction assembly.

7. The improvement of claim 6 wherein said fixed-ratio gear reduction assembly is coupled to said main drive shaft through a secondary drive shaft rotatably fixed at all times to said main drive shaft.

8. The improvement of claim 7 wherein said secondary drive shaft includes means for decoupling said secondary drive shaft from said main drive shaft when said flywheel or gear reduction assembly fails.

9. The improvement of claim 8 wherein said means for decoupling is comprised of a necked-down annular portion of said secondary drive shaft, said annular portion arranged and configured to shear at a predetermined torque load, said predetermined torque load being characteristic of torque applied to said secondary drive shaft when said flywheel assembly or gear reduction assembly fails.

* * * * *